United States Patent
Shamilian et al.

(10) Patent No.: US 7,869,363 B2
(45) Date of Patent: Jan. 11, 2011

(54) METHODS AND APPARATUS FOR PRIORITIZING MESSAGE FLOWS IN A STATE MACHINE EXECUTION ENVIRONMENT

(75) Inventors: John H Shamilian, Tinton Falls, NJ (US); Thomas L Wood, Colts Neck, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 154 days.

(21) Appl. No.: 12/040,239

(22) Filed: Feb. 29, 2008

(65) Prior Publication Data

US 2009/0219814 A1 Sep. 3, 2009

(51) Int. Cl.
*G08C 15/00* (2006.01)
(52) U.S. Cl. ...................... 370/235; 370/352
(58) Field of Classification Search ................ 370/241, 370/224, 229, 352, 230, 235; 717/143, 136; 726/9
See application file for complete search history.

(56) References Cited

U.S. PATENT DOCUMENTS

| | | | |
|---|---|---|---|
| 4,663,748 A * | 5/1987 | Karbowiak et al. ......... 370/224 |
| 5,224,108 A * | 6/1993 | McDysan et al. ........... 370/522 |
| 6,333,931 B1 * | 12/2001 | LaPier et al. ................. 370/385 |
| 6,345,042 B1 * | 2/2002 | Musial ........................ 370/241 |
| 6,363,065 B1 * | 3/2002 | Thornton et al. ............ 370/352 |
| 6,594,815 B2 * | 7/2003 | Lee et al. ...................... 716/18 |
| 6,606,588 B1 * | 8/2003 | Schaumont et al. ........... 703/15 |
| 7,346,047 B1 * | 3/2008 | Berg et al. ................... 370/352 |
| 2004/0059443 A1 * | 3/2004 | Sharangpani ................ 700/48 |
| 2004/0136344 A1 * | 7/2004 | Kim et al. .................... 370/335 |
| 2005/0105464 A1 * | 5/2005 | Acharya et al. ............. 370/229 |
| 2007/0014289 A1 * | 1/2007 | Settle .......................... 370/390 |
| 2007/0113222 A1 * | 5/2007 | Dignum et al. ............. 717/143 |
| 2008/0320452 A1 * | 12/2008 | Thompson .................. 717/136 |

* cited by examiner

*Primary Examiner*—William Trost, IV
*Assistant Examiner*—Emmanuel Maglo
(74) *Attorney, Agent, or Firm*—Ryan, Mason & Lewis, LLP

(57) ABSTRACT

A method and apparatus are provided for prioritizing message flows in a state machine execution environment. A state machine is disclosed that employs a flow graph that provides a flow control mechanism The flow control mechanism defines a plurality of states and one or more transitions between the plurality of states, wherein one or more tokens circulate within the flow graph and execute functions during the one or more transitions between the states The disclosed state machine parses one of the tokens to extract one or more predefined information elements; and assigns a priority to the token based on the extracted information elements and a state occupancy of the token, wherein the assigned priority controls an order in which the token is processed.

18 Claims, 6 Drawing Sheets

605 — If any priority queue is full
610 — Pick oldest message from highest priority queue, process that message and pass control to the associated
       token, (Return)
615 — Endif
620 — While there are incoming messages waiting on the server input by the state machine
625 — Message is partially parsed to recover information that relates the message to a particular token, if token
       not found, assign to base token.
630 — If the state machine is in an overload condition:
635 — Examine state of token to determine input message handling priority. The
       message is placed in a priority queue.
640 — If the message is immediate priority, the message is processed to completion and
       control is passed to that token.
645 — Break out while "incoming messages" loop
650 — Else continue at top of while incoming messages (check for more messages waiting on input).
655 — Else
660 — Process the message and pass control to the token.
665 — Break out of while "incoming messages" loop
670 — End of Else
675 — If either priority queue is full
680 — Pick oldest message from highest priority queue, process that message and pass control to the
       associated token.
685 — Break out of while "incoming message" loop
690 — Endif
695 — End of While
698 — Pick oldest message from highest priority queue, process that message and pass control to the associated token.
       (Return)
```

METHODS AND APPARATUS FOR PRIORITIZING MESSAGE FLOWS IN A STATE MACHINE EXECUTION ENVIRONMENT

FIELD OF THE INVENTION

The present invention relates to message processing techniques and, more particularly, to techniques for prioritizing message flows in a state machine execution environment

BACKGROUND OF THE INVENTION

Software applications are often constructed using an abstract state description language Voice over Internet Protocol (IP) (or VoIP) call control applications, for example, have been realized by using a high level description language to describe the data processing and message exchange behavior of a VoIP Media Gateway Controller (MGC). In this system, an "execution engine" accepts a high level "graph language" used by the execution engine to create internal data structures that realize the VoIP MGC behaviors described in the input graph language. The combination of the execution engine and the input file that contains the graph language describing the VoIP MGC behavior results in a system that exhibits the desired MGC processing characteristics The description language supports an enhanced transition graph model. As a result, the computation can be best understood as a graph consisting of a set of nodes connected by arcs. Using this model, there may be many tokens that exist at a given node The arcs represent transitions that tokens take between nodes. Tokens traverse arcs in response to events that can be derived from either timers or messages.

In many systems, especially those that implement VoIP call control, the system must perform predictably in the face of high demand, such as spikes of traffic Typically, a call flow will be started with an event in the form of a message, generated on behalf of a user, when a user goes off-hook or completes entering a telephone number of a desired destination. The initial event will be followed by a series of message exchanges used by the specific protocol to move the call into a quiescent state In a conventional system under heavy or overload conditions, all messages (and therefore transitions between states) will be given an equal priority This may result in a delay for the completion of a call setup message sequence (representing a call accepted by the system and already in progress), as requests for new service (e.g., a new call) will compete for resources with calls that are already in the process of being torn down. Thus, additional resources will be expended for a given offered load, as the system will not give precedence to a call in a tear-down phase that would be returning resources to the system.

A need therefore exists for an improved state machine execution environment that prioritizes message flows.

SUMMARY OF THE INVENTION

Generally, a method and apparatus are provided for prioritizing message flows in a state machine execution environment. According to one aspect of the invention, a state machine is disclosed that employs a flow graph that provides a flow control mechanism. The flow control mechanism defines a plurality of states and one or more transitions between the plurality of states, wherein one or more tokens circulate within the flow graph and execute functions during the one or more transitions between the states. The disclosed state machine parses one of the tokens to extract one or more predefined information elements; and assigns a priority to the token based on the extracted information elements and a state occupancy of the token, wherein the assigned priority controls an order in which the token is processed.

For example, the extracted information elements can comprise one or more name/value pairs As used herein, the state occupancy is a position of the token in the flow graph. The assigned priority can be based, for example, on an effect that a particular transition by the token will have on other resources In further variations, the assigned priority can be based, for example, on one or more of an amount of computation resources required by the token; a time sensitivity of the token; a determination of whether the token includes idle time and a determination of whether a response is expected by another entity to the token In one embodiment, the flow graph is a call flow graph that controls a processing of call control messages and wherein the functions include one or more of sending messages to other tokens and to external devices; and parsing incoming messages from other tokens or external devices.

According to another aspect of the invention, a higher priority can be assigned to a token that will trigger a transition that will return one or more currently used system resources to an available status The state machine can optionally assign the token to one of a plurality of priority-based queues In addition, the state machine can optionally dynamically adjust a priority assigned to the token based on an overload status. The state machine can discard one or more lower priority tokens when a priority queue of a predefined priority level is full.

A more complete understanding of the present invention, as well as further features and advantages of the present invention, will be obtained by reference to the following detailed description and drawings.

BRIEF DESCRIPTION OF THE DRAWINGS

FIG. 6 illustrates exemplary pseudo-code for a message handling process incorporating features of the present invention.

DETAILED DESCRIPTION

Figure 1:
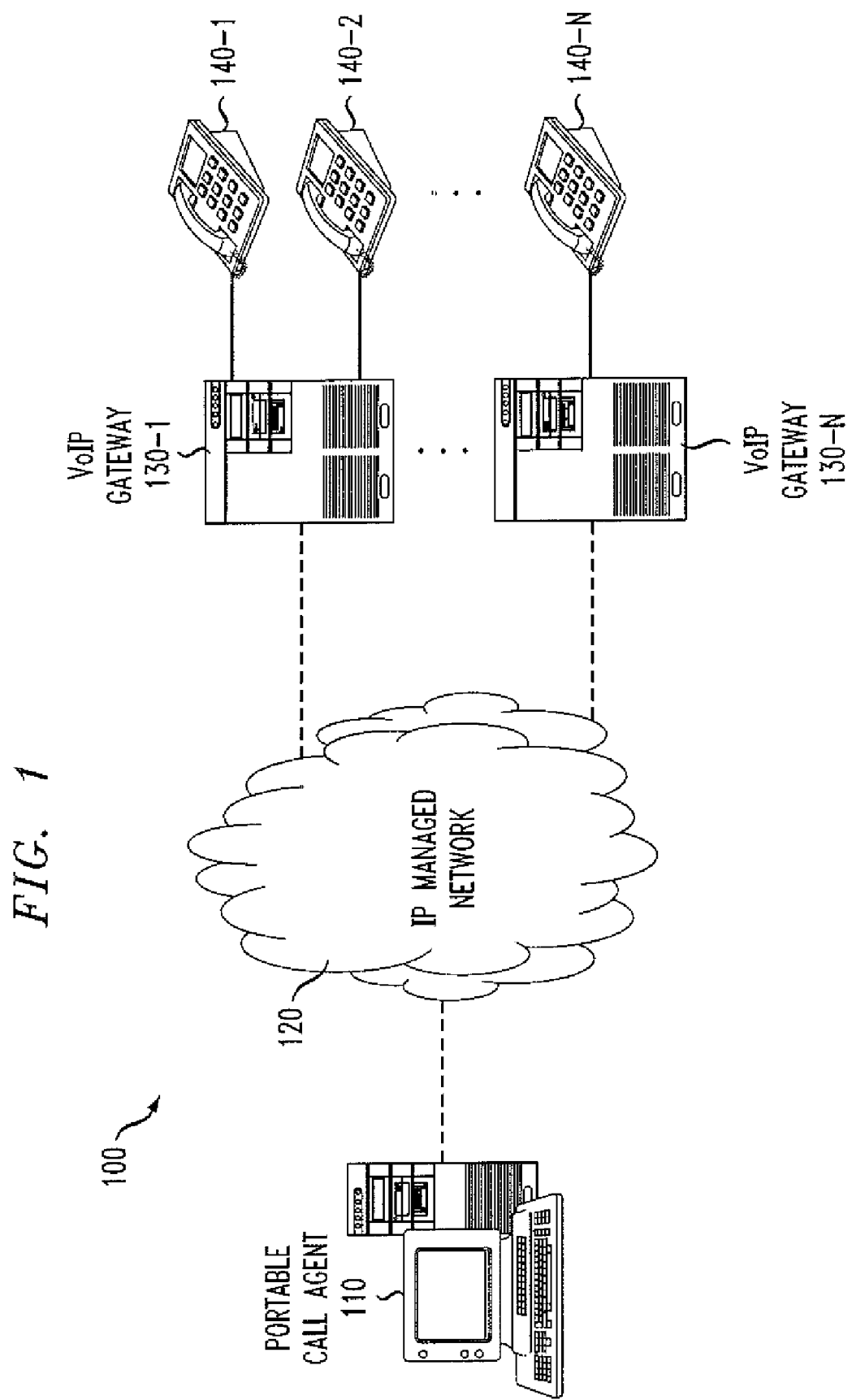
FIG. 1 illustrates an exemplary network environment in which the present invention can operate.

The present invention provides methods and apparatus for prioritizing messages flows within a formal state machine execution environment. As used herein, a flow control mechanism defines a plurality of states (or nodes) in a graph and the transition arcs between such states. The present invention provides a state machine execution environment that employs an explicit flow control mechanism. According to one aspect of the invention, the disclosed state machine execution environment employs a two-stage processing of messages. In a first stage, a preliminary pass is performed over messages (or selected portions thereof) to extract information, such as one or more name/value pairs, that can be employed to prioritize the message. In a second stage, the messages are processed using the context of the computation to choose a specific message parsing behavior Using a combination of the preliminary parsing in the first stage and the position of the target token in the call flow graph (referred to herein as the "state occupancy" of the token), it is possible to assign a priority to the subsequent processing of the message within the formal state machine execution environment. The assigned priority can be used to control the order in which messages are processed In general, the prioritization can be based on, for example, the effect that a particular state transition has on other resources. In various embodiments, the prioritization can be based, for example, one or more of the amount of required computation resources, the time sensitivity of the message, whether the required message processing includes idle time, and whether a prompt response is expected to the message. If no response is expected, the recipient can typically replay the message out of order In addition, using the assigned priority, call flows that are in the process of being set up, or being torn down, can be assigned a higher priority, thus minimizing the peak resources needed by the system to function responsively and those providing extra margin for handling overload.

According to another aspect of the invention, a conditional prioritization technique can be employed. Building upon the information that is available to the execution engine as a side effect of prioritization of the messages, the queue length of the lower priority messages can be used to set a dynamic policy for treatment of message processing. Since in this system, messages are partially processed upon reception, this mechanism can be used to selectively discard unassociated messages (i.e., messages that are not part of an existing call flow/computation) and/or unsolicited messages (i.e., messages that are not expected responses)

In a conditional prioritization implementation, as the load on the system teaches a predefined threshold, such as a "yellow zone" queue length of the lower priority messages currently waiting processing, the system would start to discard messages currently unassociated with a current flow. If the queue length of the lower priority messages continues to grow, reaching a predefined "red zone," the system begins to discard messages that are associated but are unsolicited. As the queue length shrinks below each of the thresholds described above, the system ceases discarding the related class of messages. In this way, the system will maximize its ability to properly handle extreme spikes in message traffic, minimizing the impact on memory and processing burden on the host system.

While the present invention is illustrated herein in the context of an exemplary Voice over Internet Protocol Media Gateway Controller, the present invention may be employed in any environment where a number of tokens circulate within a flow graph in a state machine and execute functions during transitions between states, as would be apparent to a person of ordinary skill in the art.

FIG. 1 illustrates an exemplary network environment 100 in which the present invention can operate. The exemplary network environment 100 is a Voice over Internet Protocol call control environment. As shown in FIG. 1, a personal call agent 110 connected to one or more VoIP Gateways 130-1 through 130-N by an IP network 120, route Voice over Internet Protocol telephone calls to or from one or more end users 140-1 through 140-N Generally, the personal call agent 110 provides multi-protocol VoIP call control, in a known manner. For example, the personal call agent 110 can provide protocol translation between one or more of the following well-known VoIP protocols: SIP, H 248, MGCP, IPDC/Q 931 and SS7/M2UA.

As discussed further below in conjunction with FIG. 3, the personal call agent 110 reduces the call flow into a combination of state and name/value pairs to enable the above-mentioned protocol inter-working It is noted that in a distributed model, multiple instances of the personal call agent 110 can create dynamic associations to provide call control to end users.

As discussed hereinafter, in the exemplary embodiment, the functionality of the present invention resides in the personal call agent 110. In this example, the VoIP control is being managed by the personal call agent 110, and the desired behavior is created by managing the messages at the personal call agent 110 without burdening the gateway 130 with additional processing requirements.

Figure 2:
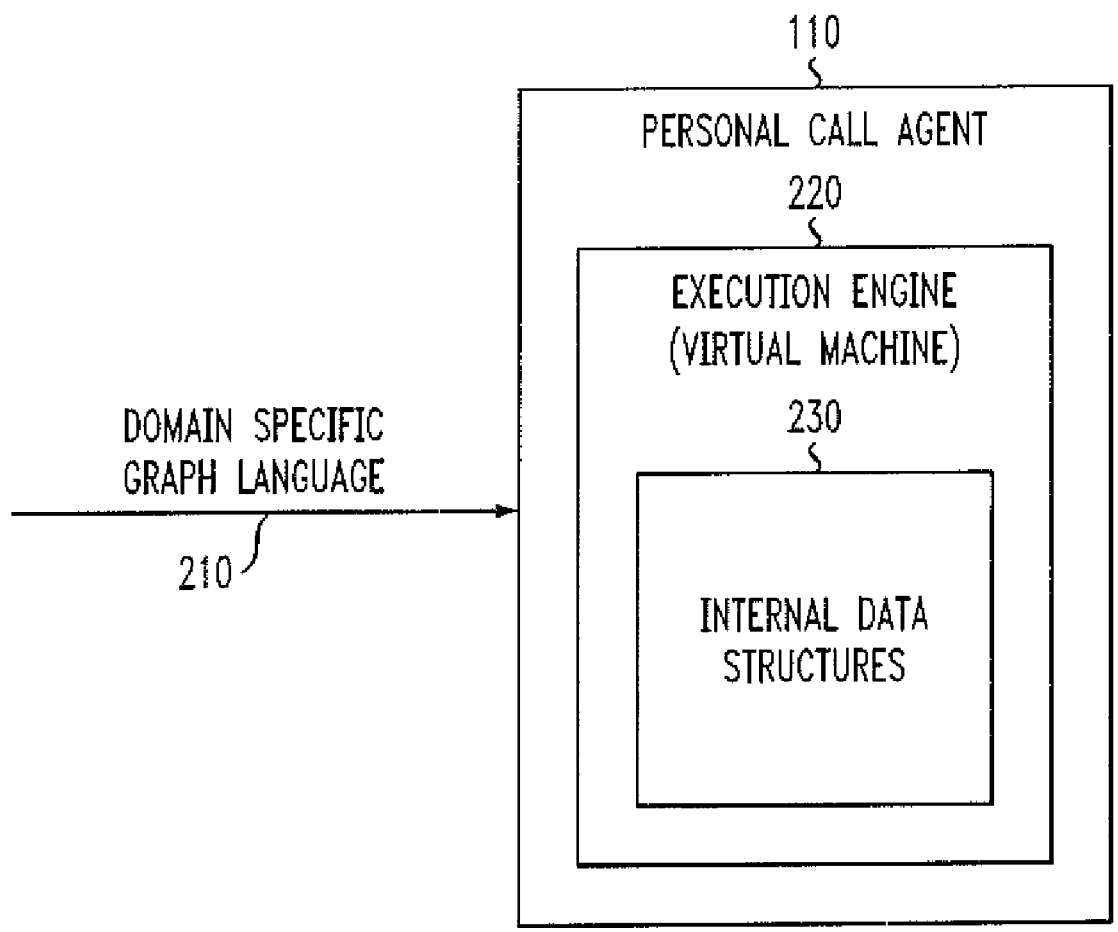
FIG. 2 illustrates an implementation of the personal call agent of FIG. 1 using a state machine execution environment incorporating features of the present invention.

FIG. 2 illustrates an implementation of the personal call agent 110 using a state machine execution environment incorporating features of the present invention. As previously indicated, software applications, such as the exemplary Voice over Internet Protocol (IP) (or VoIP) call control applications, are often constructed using an abstract state description language. As shown in FIG. 2, the personal call agent 110 includes an execution engine 220 (i.e., a virtual machine) that accepts a graph language 210 that describes the media gateway controller functions. The graph language 210 is used by the execution engine 220 to create internal data structures 230 that realize the VoIP MGC behaviors described in the input graph language 210 The combination of the execution engine 220 and the input file 210 that contains the graph language describing the VoIP MGC behavior results in a system that exhibits the desired MGC processing characteristics. Thus, the personal call agent 110 is a combination of a protocol engine 220 and a set of data files 230.

As discussed further below in conjunction with FIG. 3, the data files 230 explicitly define the call flow in terms of state transitions and message translations Generally, as discussed further below, a call flow is read into the personal call agent 110 and instantiated at start up time.

Figure 3:
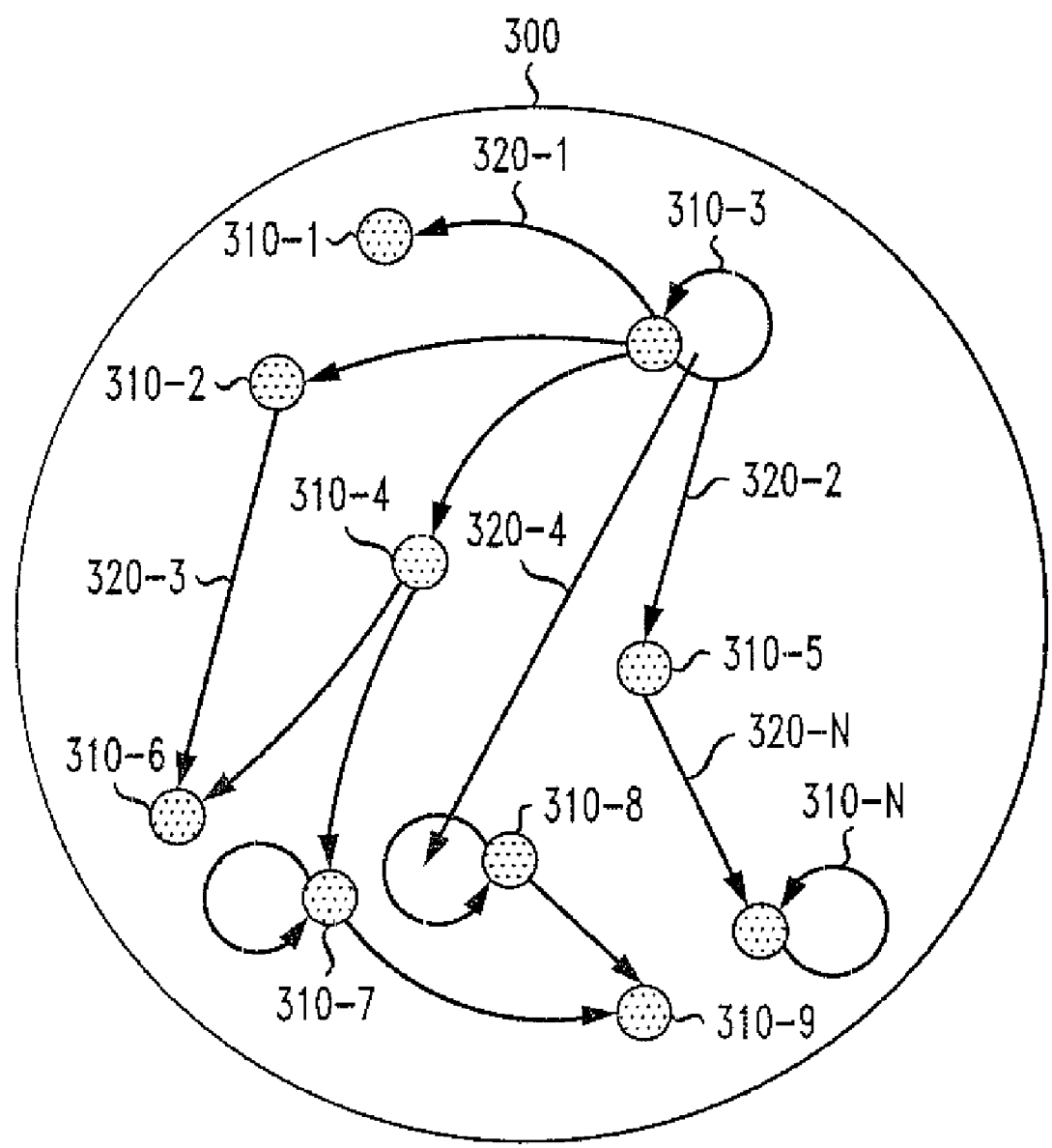
FIG. 3 illustrates an exemplary call flow graph.

FIG. 3 illustrates an exemplary call flow graph 300 (or mole generally, a "flow graph") The desired service is realized in the personal call agent 110 using a flow representation of the computation. As shown in FIG. 3, the call flow graph 300 provides a flow control mechanism that defines a plurality of states (or nodes) 310-1 through 310-N (hereinafter, collectively referred to as states 310) and the transition arcs 320-1 through 320-N (hereinafter, collectively referred to as transitions 320) between such states 310.

Generally, a number of tokens (corresponding to messages in the exemplary VoIP environment) circulate within the graph 300 and execute functions during transitions 320 between states 310. In the exemplary VoIP environment, the transition functions include sending messages to other tokens and to external devices; and parsing incoming messages from other tokens or external devices.

Figure 4:
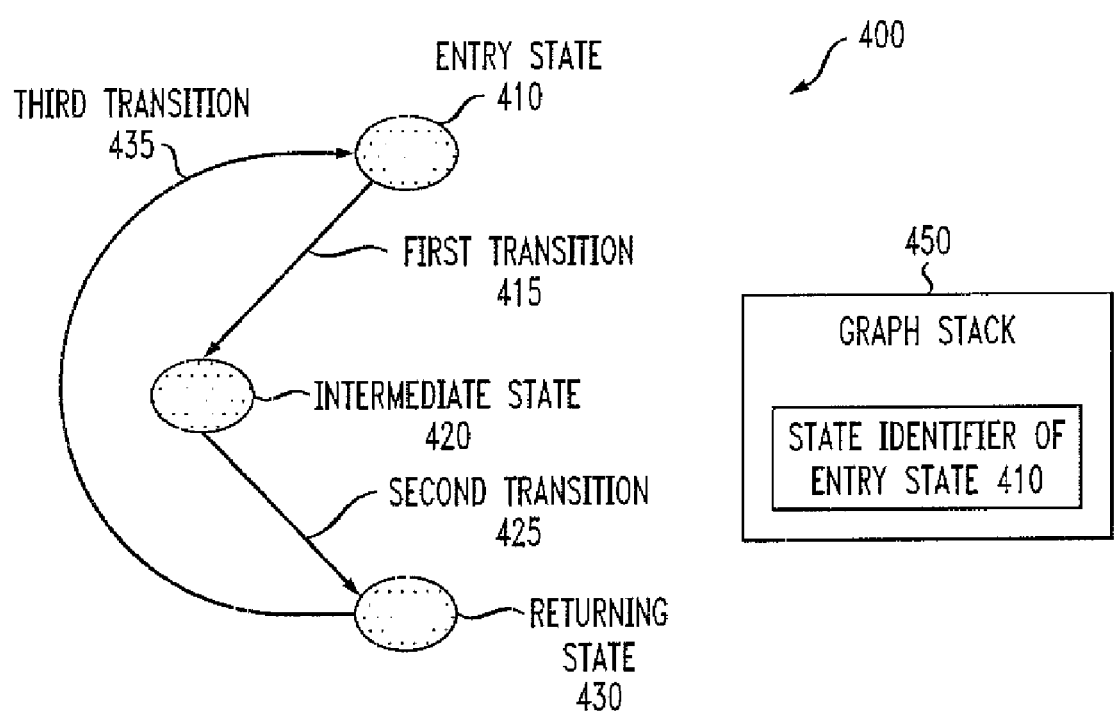
FIG. 4 illustrates an exemplary portion of a call flow graph incorporating features of the present invention.

FIG. 4 illustrates an exemplary portion of a call flow graph 400 incorporating features of the present invention Generally, a "graph function" is a function invoked at an entry state that causes the engine to pass control back to the calling state rather than to an arbitrary next state. The graph function comprises one or more states The effect is that there is a set of states that are partitionable, starting with the entry state and including all of the reachable states up to the state that uses a "graph return" to send control back to the entry state. A portion of a graph, such as the graph 300 of FIG. 3, can be considered to be a set of graph functions.

As shown in FIG. 4, an entry state 410 has a first transition 415 to an intermediate state 420. The intermediate state 420 has a second transition 425 to a returning state 430. The returning state 430 has a third transition 435 that uses a graph return to pull the next state from a graph stack 450, in a known manner. The "graph call" function executed at the entry state 410 pushes its own state number onto the graph stack 450 to be used later by the "graph return" method invoked by the returning state 430.

Figure 5:
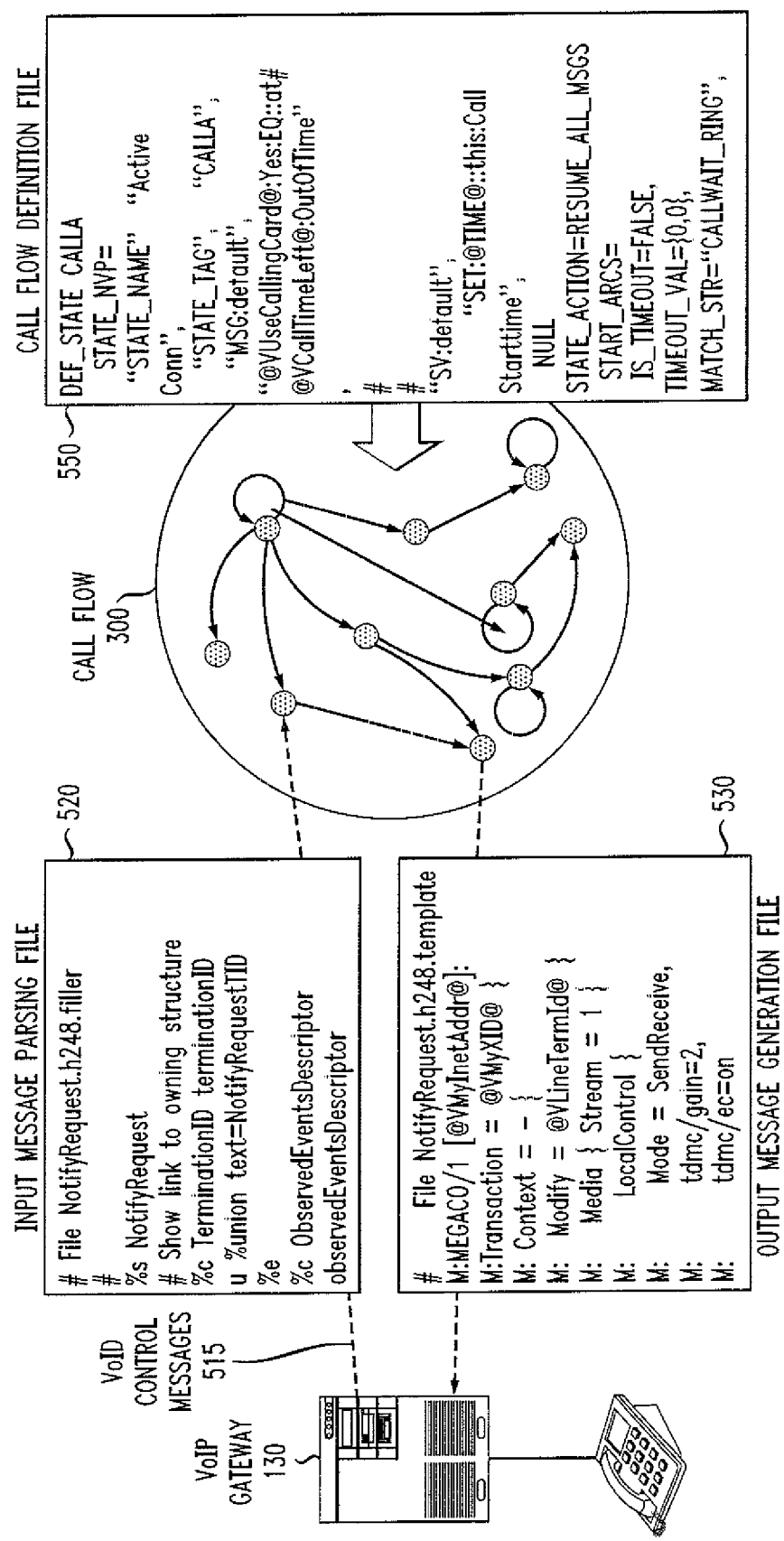
FIG. 5 illustrates the processing of VoIP control messages in accordance with an embodiment of the present invention.

FIG. 5 illustrates the processing of VoIP control messages 515 in accordance with an embodiment of the present invention. As shown in FIG. 5, the VoIP control messages 515, such as an exemplary input message parsing file 520, are applied to the exemplary call flow graph 300 of FIG. 3 The call flow graph 300 is defined by a call flow definition file 550. Thus, the call flow definition file 550 is an example of the input graph language 210 of FIG. 2

As previously indicated, a number of tokens (e.g., corresponding to messages 520) circulate within the graph 300 and execute functions during transitions between states. In the exemplary VoIP environment, the transition functions include sending messages to other tokens and to external devices; and parsing incoming messages from other tokens or external devices. In the example shown in FIG. 5, a transition function triggers the generation of an output message generation file 530

FIG. 6 illustrates exemplary pseudo-code for a message handling process 600 incorporating features of the present invention. As shown in FIG. 6, the message handling process 600 initially determines during step 605 if any priority queue is full. If any priority queue is full, then the oldest message is selected during step 610 from the highest priority queue. The selected message is processed and control is passed to the associated token before the process 600 returns.

During step 620, the process determines if there are additional incoming messages to be processed that are waiting on the server input by the state machine. If there are additional incoming messages, the message is partially parsed during step 625 to recover information that relates the message to a particular token. If a token not found, then the message is assigned to a base token.

A test is performed during step 630 to determine if the state machine is in an overload condition. If the state machine is in an overload condition, the state of the token is examined during step 635 to determine an appropriate input message handling priority. The message is then placed in a priority queue.

If it is determined during step 640 that the message has an immediate priority, then the message is processed to completion and control is passed to that token. Thereafter, the process 600 breaks out of the while "incoming messages" loop during step 645

If the message does not have an immediate priority, then the process 600 continues at the top of the while "incoming messages" loop during step 650 to check for more messages waiting on input.

If the state machine is not in an overload condition, the message is processed during step 660 and control is passed to the token. Thereafter, the process 600 breaks out of the while "incoming messages" loop during step 665

If it is determined during step 675 that either priority queue is full, then the oldest message is selected during step 680 from highest priority queue, the selected message is processed, and control is passed to the associated token. Thereafter, the process 600 breaks out of the while "incoming messages" loop during step 685.

During step 698, the process 600 selects the oldest message from the highest priority queue, processes the selected message and passes control to the associated token before returning.

While FIG. 6 shows an exemplary sequence of steps, it is also an embodiment of the present invention that the sequence may be varied. Various permutations of the algorithm are contemplated as alternate embodiments of the invention.

In addition, while exemplary embodiments of the present invention have been described with respect to processing steps in a software program, as would be apparent to one skilled in the art, various functions may be implemented in the digital domain as processing steps in a software program, in hardware by circuit elements of state machines, or in combination of both software and hardware. Such software may be employed in, for example, a digital signal processor, microcontroller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention

We claim:

1. A state machine, comprising:
   a memory containing a flow graph that provides a flow control mechanism, wherein said flow control mechanism defines a plurality of states and one or more transitions between said plurality of states, wherein one or more tokens circulate within said flow graph and execute functions during said one or more transitions between said states; and
   at least one processor, coupled to the memory, said at least one processor operative to:
   parse one of said tokens to extract one or more predefined information elements; and
   assign a priority to said token based on said extracted information elements and a state occupancy of said token, wherein said assigned priority controls an order in which said token is processed and wherein said state occupancy is a position of said token in said flow graph.

2. The state machine of claim 1, wherein said extracted information elements comprise one or more name/value pairs.

3. The state machine of claim 1, wherein said assigned priority is based on an effect that a particular transition by said token will have on other resources.

4. The state machine of claim 1, wherein said assigned priority is based on one or more of an amount of computation resources required by said token; a time sensitivity of said token; a determination of whether said token includes idle time and a determination of whether a response is expected by another entity to said token.

5. The state machine of claim 1, wherein a higher priority is assigned to a token that will trigger a transition that will return one or more currently used system resources to an available status.

6. The state machine of claim 1, wherein said flow graph is a call flow graph that controls a processing of call control messages and wherein said functions include one or more of sending messages to other tokens and to external devices; and parsing incoming messages from other tokens or external devices.

7. The state machine of claim 1, wherein said processor is further configured to assign said token to one of a plurality of priority-based queues.

8. The state machine of claim 1, wherein said processor is further configured to dynamically adjust a priority assigned to said token based on an overload status.

9. The state machine of claim 1, wherein said processor is further configured to discard one or more lower priority tokens when a priority queue of a predefined priority level is full.

10. A method for prioritizing message flows in a state machine execution environment, wherein said state machine execution environment employs a flow graph that provides a flow control mechanism, wherein said flow control mechanism defines a plurality of states and one or more transitions between said plurality of states, wherein one or more tokens circulate within said flow graph and execute functions during said one or more transitions between said states, said method comprising:
    parsing one of said tokens to extract one or more predefined information elements; and
    assigning a priority to said token based on said extracted information elements and a state occupancy of said token, wherein said assigned priority controls an order in which said token is processed and wherein said state occupancy is a position of said token in said flow graph.

11. The method of claim 10, wherein said extracted information elements comprise one or more name/value pairs.

12. The method of claim 10, wherein said assigned priority is based on an effect that a particular transition by said token will have on other resources.

13. The method of claim 10, wherein said assigned priority is based on one or more of an amount of computation resources required by said token; a time sensitivity of said token; a determination of whether said token includes idle time and a determination of whether a response is expected by another entity to said token.

14. The method of claim 10, wherein a higher priority is assigned to a token that will trigger a transition that will return one or more currently used system resources to an available status.

15. The method of claim 10, wherein said flow graph is a call flow graph that controls a processing of call control messages and wherein said functions include one or more of sending messages to other tokens and to external devices; and parsing incoming messages from other tokens or external devices.

16. The method of claim 10, wherein said processor is further configured to assign said token to one of a plurality of priority-based queues.

17. The method of claim 10, wherein said processor is further configured to dynamically adjust a priority assigned to said token based on an overload status.

18. An article of manufacture for prioritizing message flows in a state machine execution environment, wherein said state machine execution environment employs a flow graph that provides a flow control mechanism, wherein said flow control mechanism defines a plurality of states and one or more transitions between said plurality of states, wherein one or more tokens circulate within said flow graph and execute functions during said one or more transitions between said states, said article of manufacture comprising a machine readable storage medium containing one or more programs which when executed implement the steps of:
    parsing one of said tokens to extract one or more predefined information elements; and
    assigning a priority to said token based on said extracted information elements and a state occupancy of said token, wherein said assigned priority controls an order in which said token is processed and wherein said state occupancy is a position of said token in said flow graph.

* * * * *